United States Patent
Inoue et al.

(10) Patent No.: US 10,741,879 B2
(45) Date of Patent: Aug. 11, 2020

(54) SECONDARY BATTERY AND PRODUCTION METHOD THEREFOR

(71) Applicant: NEC Corporation, Tokyo (JP)

(72) Inventors: Kazuhiko Inoue, Tokyo (JP); Kenichi Shimura, Tokyo (JP); Noboru Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 15/521,263

(22) PCT Filed: Oct. 19, 2015

(86) PCT No.: PCT/JP2015/079450
§ 371 (c)(1),
(2) Date: Apr. 21, 2017

(87) PCT Pub. No.: WO2016/063835
PCT Pub. Date: Apr. 28, 2016

(65) Prior Publication Data
US 2017/0317387 A1    Nov. 2, 2017

(30) Foreign Application Priority Data
Oct. 21, 2014    (JP) .................... 2014-214855

(51) Int. Cl.
*H01M 10/0569*    (2010.01)
*H01M 10/0585*    (2010.01)
(Continued)

(52) U.S. Cl.
CPC ......... *H01M 10/0569* (2013.01); *H01M 2/16* (2013.01); *H01M 2/162* (2013.01);
(Continued)

(58) Field of Classification Search
CPC ............ H01M 10/42; H01M 10/0565; H01M 10/0569; H01M 10/0568; H01M 2/34; H01M 2/16
See application file for complete search history.

(56) References Cited

U.S. PATENT DOCUMENTS 4,857,423 A * 8/1989 Abraham ................ H01M 4/36
                                                                   252/62.2
5,605,549 A * 2/1997 Zucker .................. H01M 10/10
                                                                   29/623.1
(Continued)

FOREIGN PATENT DOCUMENTS

JP    2001-84984 A    3/2001
JP    2005-216788 A    8/2005
(Continued)

OTHER PUBLICATIONS

International Search Report and Written Opinion dated Jan. 19, 2016, in corresponding PCT International Application.
(Continued)

*Primary Examiner* — Kenneth J Douyette
(74) *Attorney, Agent, or Firm* — Finnegan, Henderson, Farabow, Garrett & Dunner, L.L.P.

(57) ABSTRACT

Provided is a secondary battery which uses a heat generating reaction of the redox shuttle agent to achieve stopping a function of the battery by blocking ion conduction and rapidly increasing an internal resistance by means of volatilized non-aqueous solvent when an abnormality such as overcharge occurs. A secondary battery 1 comprises a battery element comprising a positive electrode 11, a negative electrode 12, a separator 13, and an electrolytic solution, and a casing sealing the battery element. The electrolytic solution comprises a redox shuttle agent and an organic solvent having a boiling point of 125° C. or less. The separator 13 comprises aramid fiber assembly, aramid microporous struc- (Continued)

ture, polyimide microporous structure or polyphenylenesulfide microporous structure, and polyphenylenesulfide, and has an average void size of 0.1 μm or more.

17 Claims, 5 Drawing Sheets

(51) Int. Cl.
  *H01M 2/16* (2006.01)
  *H01M 10/0565* (2010.01)
  *H01M 10/0567* (2010.01)
  *H01M 10/052* (2010.01)

(52) U.S. Cl.
  CPC ..... *H01M 10/052* (2013.01); *H01M 10/0565* (2013.01); *H01M 10/0567* (2013.01); *H01M 10/0585* (2013.01); *H01M 2220/10* (2013.01); *H01M 2220/20* (2013.01); *Y02E 60/122* (2013.01); *Y02T 10/7011* (2013.01)

(56) References Cited

U.S. PATENT DOCUMENTS

| | | | | |
|---|---|---|---|---|
| 6,509,122 | B1* | 1/2003 | Oyama | C08F 290/062 429/303 |
| 2002/0164528 | A1* | 11/2002 | Sunagawa | C01G 45/1242 429/231.3 |
| 2005/0147889 | A1* | 7/2005 | Ohzuku | H01M 4/131 429/231.1 |
| 2005/0186479 | A1* | 8/2005 | Totsuka | H01M 2/1653 429/251 |
| 2007/0092802 | A1 | 4/2007 | Ahn et al. | |
| 2009/0220855 | A1* | 9/2009 | Shelekhin | H01M 2/16 429/163 |
| 2010/0196766 | A1* | 8/2010 | Park | H01M 4/0445 429/338 |
| 2011/0294003 | A1 | 12/2011 | Zhang et al. | |
| 2011/0318645 | A1* | 12/2011 | Han | H01M 10/0565 429/303 |
| 2013/0330607 | A1 | 12/2013 | Mizuno et al. | |
| 2014/0234703 | A1* | 8/2014 | Zhang | H01M 10/0525 429/200 |

FOREIGN PATENT DOCUMENTS

| | | |
|---|---|---|
| JP | 2006-59717 A | 3/2006 |
| JP | 2007-287445 | 11/2007 |
| JP | 2009-514149 | 2/2009 |
| JP | 2011-243568 | 12/2011 |
| JP | 2012-064569 | 3/2012 |
| JP | 2013-530944 | 8/2013 |
| JP | 2013-216934 | 10/2013 |
| JP | 2013-232328 | 11/2013 |
| JP | 2014-086185 | 5/2014 |
| WO | WO 2012/111338 A1 | 8/2012 |

OTHER PUBLICATIONS

Decision to Grant a Patent dated Sep. 3, 2019, by the Japanese Patent Office in counterpart Japanese Patent Application No. JP 2016-565213.

* cited by examiner

SECONDARY BATTERY AND PRODUCTION METHOD THEREFOR

CROSS-REFERENCE TO RELATED PATENT APPLICATIONS

This application is a National Stage Entry of International Application No. PCT/JP2015/079450, filed Oct. 19, 2015, which claims priority from Japanese Patent Application No. 2014-214855, filed Oct. 21, 2014, The entire contents of the above-referenced applications are expressly incorporated herein by reference.

TECHNICAL FIELD

The present invention relates to a secondary battery provided with a mechanism for breaking an external electrical connection when an abnormality suck as overcharge occurs, and a production method therefore.

BACKGROUND ART

Batteries are called canned energy, and it is important that they can be handled safely. In order to ensure safety even at the time of abnormalities such as overcharge and short circuit, a protection circuit such as a fuse capable of detecting abnormalities of a battery and breaking the external electrical connection of the battery is used to control the battery. Also, a mechanism for breaking an electrical connection by utilizing an abnormally increased internal pressure of a battery itself is proposed as well.

As such a secondary battery, Patent Literature 1 discloses a secondary battery in which a non-aqueous electrolyte contains a redox shuttle agent capable of causing a reversible oxidation-reduction reaction at a higher potential than a positive electrode active material and a gas generating agent capable of generating gas when a predetermined battery voltage is exceeded. Patent Literature 1 further states that a viscosity modifier capable of suppressing a decrease in the viscosity of the non-aqueous electrolyte resulting from a temperature increase is contained. Also, Patent Literature 2 discloses that a non-woven fabric of cellulose or the like having a pore size of about 0.1 μm to 10 μm is used as a separator in order to achieve stable charge-discharge characteristics that do not allow a short circuit resulting from a separator being thermally melted or shrunk. Moreover, a low-molecular gelling agent is contained in an electrolytic solution to improve the size of pores specific to a non-woven fabric and the non-uniformity of pore size distribution. Patent Literature 3 discloses an overcharge preventing mechanism by means of a redox shuttle agent added to an electrolyte solution.

CITATION LIST

Patent Literature

Patent Literature 1: Japanese Patent Laid-Open No. 2013-218934
Patent Literature 2: Japanese Patent Laid-Open No. 2012-064569
Patent Literature 3: Japanese Patent Laid-Open No. 2007-287445

SUMMARY OF INVENTION

Technical Problem

However, in electric automobiles and large-scale power storage facilities, a large number of batteries are connected in series and in parallel to ensure predetermined battery capacities and voltages and, thus, providing each battery with a protection circuit results in a significant cost increase. Also, a malfunction of one circuit causes the entire system to stop, and a practical application is thus difficult. In addition, it is difficult to use in a layered laminate battery a mechanism that senses the internal pressure and physically blocks the electrical circuit by gas.

On the other hand, since the redox shuttle agent generates heat during operation, in the case of a battery with a high energy density and a high capacity, when a large charging current is applied in the fully charged state, the heat radiation cannot catch up and the temperature of battery due to the heat generation of the redox shuttle agent rises significantly. At this time, if the melting point of the separator is low, there is a possibility that the separator melts to cause short-circuit between the positive electrode and the negative electrode. In addition, even if a high heat resistant separator is used, there is a possibility that electrolysis of the electrolytic solution occurs and it is in a dangerous state.

Accordingly, an object of the present invention is to provide a secondary battery which uses a heat generating reaction of the redox shuttle agent to achieve stopping a function of the battery by blocking ion conduction and rapidly increasing an internal resistance by means of volatilized non-aqueous solvent when an abnormality such as overcharge occurs.

Solution to Problem

The secondary battery of the present, invention comprises:
a battery element comprising a positive electrode, a negative electrode, a separator, and an electrolytic solution; and
a casing sealing the battery element, wherein
the electrolytic solution comprises a redox shuttle agent and an organic solvent having a boiling point of 125° C. or less; and
the separator comprises aramid fiber assembly, aramid micropore us structure, polyimide microporous structure or polyphenylenesulfide microporous structure, and has an average void size of 0.1 μm or more.

Also, the present invention provides a production method for a secondary battery. The production method for a secondary battery of the present invention comprises:
a step of providing an electrolytic solution comprising a redox shuttle agent and an organic solvent having a boiling point of 25° C. or less;
a step of providing a separator comprising aramid fiber assembly, aramid microporous structure, polyimide microporous structure or polyphenylenesulfide microporous structure, and having an average void size of 0.1 μm or more;
a step of providing a positive electrode and a negative electrode;
a step of oppositely disposing the positive electrode and the negative electrode, with the separator in-between;
a step of enclosing the oppositely disposed separator, positive electrode, and negative electrode within the casing together with the electrolytic solution.

Advantageous Effects of Invention

According to the present invention, the electrolytic solution contains a redox shuttle agent and an organic solvent having a boiling point of 125° C. or less, and thus when abnormal charging voltage occurs in the secondary battery, bubbles are generated in the electrolytic solution by the action the redox shuttle agent and the electrolytic solution, and ion conduction between the electrodes can be blocked by the bubbles. As a result, the function of the secondary battery can be stopped before the secondary battery reaches thermal run-away. In particular, since the separator includes aramid fiber assembly, aramid microporous structure, polyimide microporous structure or polyphenylenesulfide microporous structure, and has an average void size of 0.1 μm or more, bubbles also enter the voids of the separator, and the voids of the separator are retained even when abnormal heal generation occurs is the secondary battery. As a result, ion conduction can be blocked more effectively.

DESCRIPTION OF EMBODIMENTS

Figure 1:
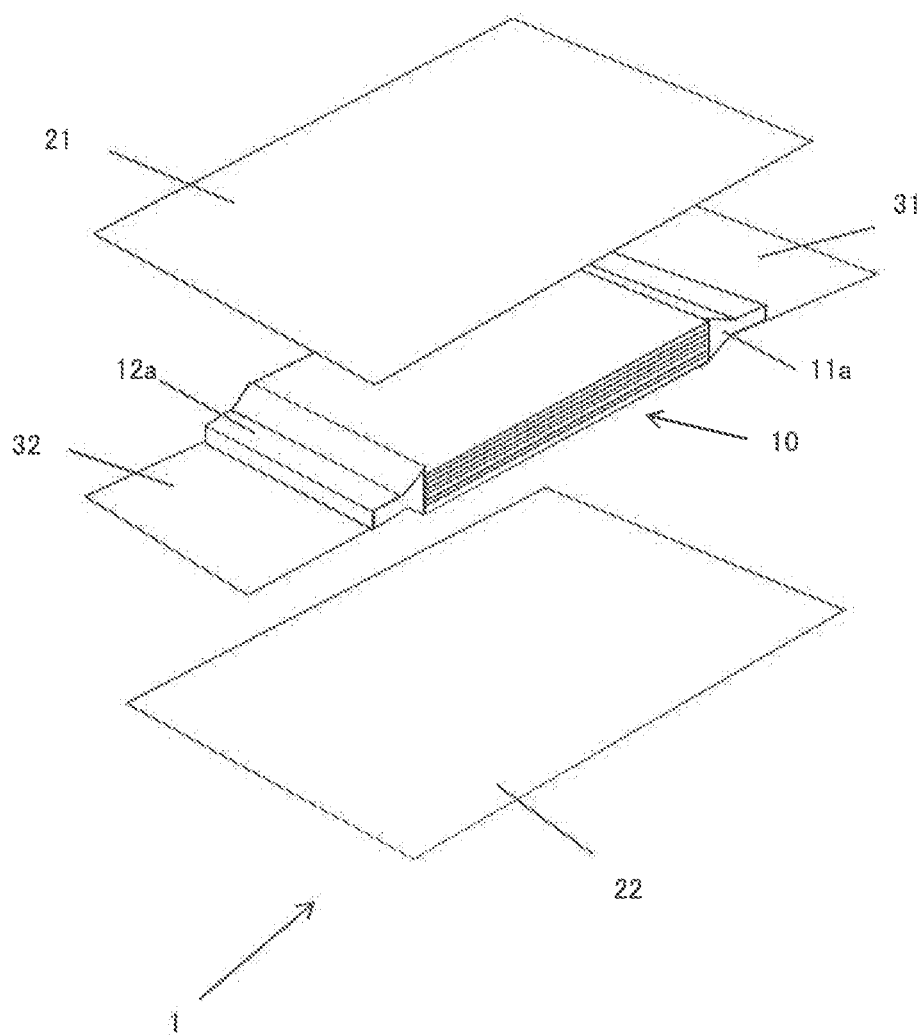
FIG. 1 is an exploded perspective view of a secondary battery according to one embodiment of the present invention.

Referring to FIG. 1, an exploded perspective view of a secondary battery 1 according to one embodiment of the present invention is shown. The secondary battery of the present embodiment has a battery element 10, a casing sealing the battery element 10, and a positive electrode terminal 31 and a negative electrode terminal 32 electrically connected to the battery element 10 and extending to the outside of the casing. The casing is composed of flexible casing materials 21, 22 such as laminate film, and the outer circumferential part is thermally fused, with the battery element 10 being surrounded, to thereby seal the battery element 10.

Figure 2:
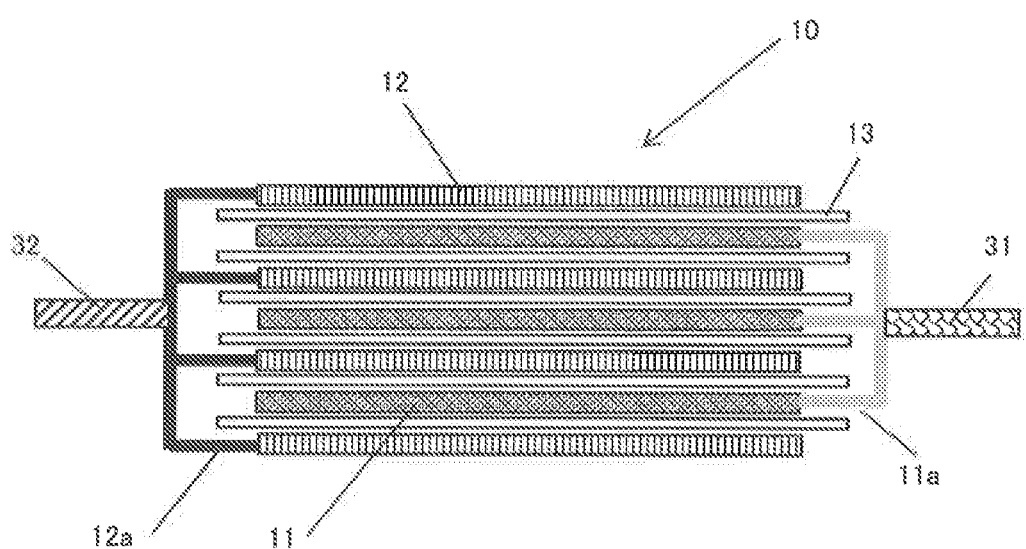
FIG. 2 is a schematic cross-sectional view of the battery element shown in FIG. 1.

As shown in FIG. 2, the battery element 10 includes the positive electrode 11, the negative electrode 12, the separator 13, and an electrolytic solution, and typically has a configuration in which a plurality of negative electrodes 12 and a plurality of positive electrodes 11 are alternately disposed to face each other, with the separators 13 in-between. The electrolytic solution is sealed within the casing together with these positive electrodes 11, negative electrodes 12, and separators 13, The negative electrode 12 has an extension (also referred to as a tab) projecting from the separator 13. The extension is an end of a negative electrode current collector 12a of the negative electrode 12, which is not covered with a negative electrode active material, Concerning the positive electrodes 11 as well, an extension (tab) projects from the separator 13, which is an end of a positive electrode current collector 11a of the positive electrode 11 not covered with the positive electrode active material. The extension of the positive electrode 11 and the extension of the negative electrode 12 are formed in positions where the positive electrode 11 and the negative electrode 12 do not interfere with each other when the positive electrode 11 and the negative electrode 12 are laminated. The extensions of all negative electrodes 12 are integrated into one, and connected to the negative electrode terminal 32 by welding. Concerning the positive electrodes 11 as well, the extensions of all positive electrodes 11 are integrated into one, and connected to the positive electrode terminal 31 by welding.

Figure 3:
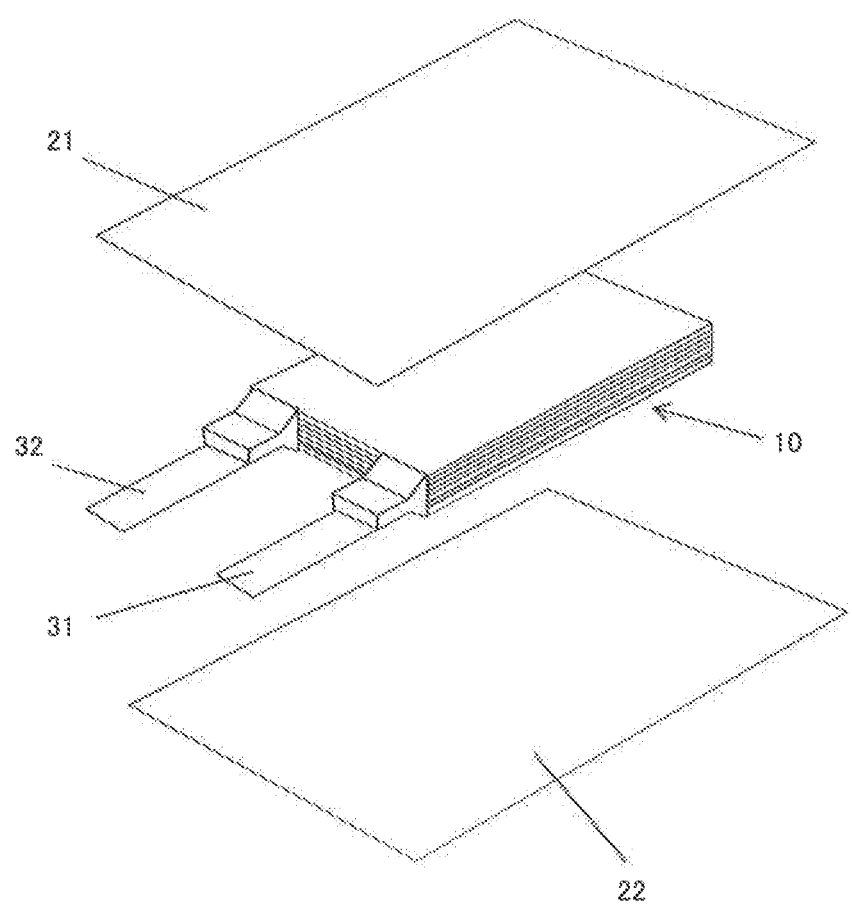
FIG. 3 is an exploded perspective view of a secondary battery according to one embodiment of the present invention wherein the positive electrode terminal and the negative electrode terminal are drawn out in the same direction.

In the example shown in FIG. 1, the positive electrode terminal 31 and the negative electrode terminal 32 are drawn out in the mutually opposite directions, but the positive electrode terminal 31 and the negative electrode terminal 32 may be drawn out in any directions. For example, as shown in FIG. 3, the positive electrode terminal 31 and the negative electrode terminal 32 may be drawn out from the same side of the battery element 10, and, although not depicted, the positive electrode terminal 31 and the negative electrode terminal 32 may be drawn out respectively from two adjacent sides of the battery element 10. In any case, the extensions (tabs) not covered with the active materials of the positive electrode 11 and the negative electrode 12 are formed in positions corresponding to the positions where the positive electrode terminal 31 and the negative electrode terminal 32 are drawn out.

The secondary battery 1 of the present embodiment configured as above is characterized especially in that the electrolytic solution contains a gel component and an organic solvent having a boiling point of 125° C. or less (hereinafter referred to as a "low-boiling point solvent"), and the separator includes a fiber assembly composed of a plurality of fibers composed of one or more resins selected from aramid, polyimide, and polyphenylenesulfide, and has an average void size of 0.1 μm or more.

According to the secondary battery of the present embodiment, even when abnormal charging voltage which causes an overcharge to the secondary battery occurs, bubbles are generated in the electrolytic solution due to a heat generation action of the redox shuttle agent and a volatilization action of the low-boiling point solvent by heat generation. These bubbles block ion conduction between the electrodes. Accordingly, the function of the secondary battery can be safely stopped before the secondary battery reaches thermal run-away. The positive electrode active material does not normally undergo thermal run-away at a temperature of 125° C. or less, and thus thermal run-away can be more effectively suppressed by suitably adjusting the kind of low-boiling point solvent and/or the content in the electrolytic solution such that bubbles are generated at a temperature of 125° C. or less.

The mechanism that bubbles are generated in the electrolytic solution is as follows. Due to the redox shuttle agent contained in the electrolytic solution, when an abnormal voltage is applied to the secondary battery, electrical energy is converted to heat by repetition of oxidation-reduction reaction of the redox shuttle agent. The low-boiling point solvent is volatilized due to the heat generated by the repetition of oxidation-reduction reaction whereby gas is generated between the electrodes. Moreover, since the average void size of the separator is 0.1 μm or more, the volatilized gas also enters the voids of the separator. As a result, ion conduction can be efficiently blocked.

Also, since resins such as aramid, polyimide, and polyphenylenesulfide have high heat resistance, aramid fiber assembly, aramid microporous structure, polyimide microporous structure or polyphenylenesulfide microporous structure that uses the resin used as a separator can maintain insulation between the electrodes until a low-volatility electrolytic solution component is expelled from between the electrodes by a high-volatility electrolytic solution component. Combustion of the electrolytic solution does not occur unless a short circuit occurs in the secondary battery, and the secondary battery is in a safe condition.

Below, the separator, the negative electrode, the positive electrode, the electrolytic solution, and casing that are principal constituents of the secondary battery are described in reference to a lithium ion secondary battery as an example.

<Separator>

Preferably, the separator in the present embodiment has a heat fusion or heat decomposition temperature of 180° C. or more, and the average void size of the separator is 0.1 µm or more. Materials having a melting point or a decomposition temperature of 180° C. or more are polyethylene terephthalate (PET), aramid, polyimide, polyphenylenesulfide (PPS), and the like for polymeric materials. PET is available at low cost and thus preferable. Among these, aramid, polyimide, and PPS have a heat resistance of 300° C. or more, are unlikely to thermally shrink, thus can suitably provide more stable batteries, and are thus particularly preferable.

As for the structure of the separator, as long as the separator can be composed of a fiber assembly such as woven fabric or non-woven fabric, a microporous membrane, and the like having voids that impart a high permeability, any structure can be employed. Among these, a separator made of woven fabric or non-woven fabric has a particularly large average void size and is preferable. Specific examples include fiber assemblies of an aramid fiber, a polyimide fiber, and the like.

The aramid polymer constituting an aramid fiber is a polymer in which one kind or two or more kinds of divalent aromatic groups are directly connected by an aramid bond. The aromatic groups may be such that two aromatic rings are bonded via oxygen, sulfur, or alkylene group. Also, these divalent aromatic groups may contain lower alkyl group such as methyl group or ethyl group, methoxy group, halogen group such as chloro group, or the like. Moreover, the aramid bond is not limited, and may be any of the para form and the meta form.

Examples of the aramid fiber preferably usable in the present invention include polymetaphenylene isophthalamide fiber, polyparaphenylene terephthalamide fiber, and copolyparaphenylene 3,4-oxydiphenylene terephthalamide fiber.

In order to favorably retain bubbles generated in the electrolytic solution between the electrodes within the separator, the separator preferably has a certain thickness, e.g., 5 µm or more, more preferably 10 µm or more, and even more preferably 15 µm or more. On the other band, in order to increase the energy density and reduce the internal resistance of the secondary battery, the separator is preferably thin, e.g., 50 µm or less, more preferably 30 µm or less, and even more preferably 25 µm or less.

The average void size of the separator is preferably 0.1 µm or more, more preferably 0.5 µm or more, and even more preferably 1 µm or more. Due to the average voidage being 0.1 µm or more, bubbles generated in the electrolytic solution between the electrodes can be favorably retained within the separator. On the other hand, in order to prevent a short circuit resulting from dendrites to enhance insulation between the electrodes, a small average void size, e.g., 10 µm or less is preferable, more preferably 8 µm or less, and even more preferably 5 µm or less. Also, from the same viewpoint, the maximum void size of the separator is preferably 50 µm or less.

The void size of the separator can be determined by the bubble point method and the mean flow method set forth in STM-F-316. Also, the average void size can be an average obtained by measuring void sizes at random, five places of the separator and taking an average thereof.

<Negative Electrode>

The negative electrode has a negative electrode current collector formed of metal foil and a negative electrode active material applied to both surfaces or one surface of the negative electrode current collector. The negative electrode active material is adhered using a negative electrode binding agent so as to cover the negative electrode current collector. The negative electrode current collector is formed to have an extension for connection to a negative electrode terminal, and this extension is not coated with the negative electrode active material.

The negative electrode active material in the present embodiment is not particularly limited, and, examples include carbon materials capable of absorbing and desorbing lithium ions, metals capable of alloying with lithium, and metal oxides capable of absorbing and desorbing lithium ions.

Examples of the carbon materials include carbon, amorphous carbon, diamond-like carbon, carbon nanotube, and composites thereof. Here, highly crystalline carbon is highly electroconductive, and has excellent adhesion to a negative electrode current collector composed of a metal, such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain, boundaries and defects.

The negative electrode containing a metal or a metal oxide can enhance the energy density, and is thus preferable in that the capacity per unit weight or per unit volume of the battery can be increased.

Examples of the metal include Al, Si, Pb, Sn, In, Bi, Ag, Ba, Ca, Hg, Pd, Pt, Te, Zn, La, and alloys of two or more of these. Also, these metals or alloys may be used as a mixture of two or more. Also, these metals or alloys may contain one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material, and silicon oxide is more preferably contained. This is because silicon oxide is relatively stable and is unlikely to trigger a reaction with other compounds. Also, for example, 0.1 to 5 mass % of one or two or more elements selected from nitrogen, boron, and sulfur can be added to the metal oxide. In this way, the electroconductivity of the metal oxide can be enhanced. Also, the electroconductivity can be similarly enhanced by coating the metal or the metal oxide with an electroconductive material such as carbon by, for example, vapor deposition or a like method.

Also, for the negative electrode active material, not a single material but a plurality of materials as a mixture can be used. For example, the same kind of materials such as graphite and amorphous carbon may be mixed, and different kinds of materials such as graphite and silicon may be mixed.

The negative electrode binding agent is not particularly limited, and, for example, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamide inside, and polyacrylic acid can be used. The amount of the negative electrode binding agent used is preferably 0.5 to 25 parts by mass based on 100 parts by mass of the negative electrode active material from the viewpoint of a trade-off between "sufficient binding strength" and "high energy".

Aluminum, nickel, stainless steel, chromium, copper, silver, and alloys thereof are preferable for the negative electrode current collector in terms of electrochemical stability. Examples of its shape include foil, plate, and mesh.

An electroconductive auxiliary material may be added to a coating layer containing the negative electrode active material to lower impedance. Examples of the electroconductive auxiliary material include flaky, sooty, and fibrous carbonaceous microparticles such as graphite, carbon black, acetylene black, a vapor grown carbon fiber (VGCF® manufactured by Shows Denko K.K.).

<Positive Electrode>

The positive electrode has a positive electrode current collector formed of metal foil and a positive electrode active material applied to both surfaces or one surface of the positive electrode current collector. The positive electrode active material is adhered using a positive electrode binding agent so as to cover the positive electrode current collector. The positive electrode current collector is formed to have an extension for connection to a positive electrode terminal, and this extension is not coated with the positive electrode active material.

The positive electrode active material in the present embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate ($LiNiO_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \quad\quad (A)$$

(provided that $0 \leq x < 1$, $0 < y \leq 1.2$, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0 < \alpha \leq 1.2$ preferably $1 \leq \alpha \leq 1.2$, $\beta+\gamma+\delta=1$, $\beta \geq 0.6$ preferably $\beta \geq 0.7$, $\gamma \leq 0.2$), and, in particular, $LiNi_\beta Co_\gamma Mn_\delta O_2$ ($0.75 \leq \beta \leq 0.85$, $0.05 \leq \gamma \leq 0.15$, $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni contest does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ ($0 < \alpha \leq 1.2$ preferably $1 \leq \alpha \leq 1.2$, $\beta+\gamma+\delta=1$, $0.2 \leq \beta \leq 0.5$, $0.1 \leq \gamma \leq 0.4$, $0.1 \leq \delta \leq 0.4$). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ ($0 < x < 2$), $Li_2MnO_3$, and $Li_xMn_{1.5}Ni_{0.5}O_4$ ($0 < x < 2$); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, F, Ti, Si, Fb, Sn, In, Bi, Ag, Ba, Ca, Hg, Fd, Ft, Te, Zn, La, or the like can be used as well. One of the positive electrode active materials described above may be used singly, or two or more can be used in combination.

It is also possible to use a radical material or the like as a positive electrode active material.

A positive electrode binding agent similar to the negative electrode binding agent can be used. The amount of the positive electrode binding agent used is preferably 2 to 15 parts by mass based on 100 parts by mass of the positive electrode active material from the viewpoint of a trade-off between "sufficient binding strength" and "high energy".

For example, aluminum, nickel, silver, or an alloy thereof can be used as a positive electrode current collector. Examples of the shape of the positive electrode current collector include foil, plate, and mesh. Aluminum foil can be suitably used as a positive electrode current collector.

An electroconductive auxiliary material may be added to a coating layer of the positive electrode active material to lower impedance. Carbonaceous microparticles such as graphite, carbon black, and acetylene black can be used as electroconductive auxiliary materials.

<Electrolytic Solution>

As the electrolytic solution used in the present embodiment, a non-aqueous electrolytic solution containing a lithium salt (a supporting electrolyte) and a non-aqueous solvent that dissolves this supporting electrolyte can be used. Moreover, in the present invention, the electrolytic solution contains a redox shuttle agent.

Lithium salts usable in commonly used lithium ion batteries, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, and $LiN(CF_3SO_2)_2$, can be used as supporting electrolytes. One supporting electrolyte can be used singly, or two or more can be used in combination.

Aprotic organic solvents such as carbonic acid esters (chain or cyclic carbonates), carboxylic acid esters (chain or cyclic carboxylic acid esters), and phosphoric acid esters can be used as non-aqueous solvents.

Examples of the carbonic acid ester solvents include cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); and propylene carbonate derivatives.

Examples of the carboxylic acid ester solvents include aliphatic carboxylic acid esters such as methyl formate, methyl acetate, and ethyl propionate; and lactones such as γ-butyrolactone.

Among these, carbonic acid esters (cyclic or chain carbonates) such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and dipropyl carbonate (DPC) are preferable.

Examples of the phosphoric acid esters include trimethyl phosphate, triethyl phosphate, tripropyl phosphate, trioctyl phosphate, and triphenyl phosphate.

Also, other examples of solvents that can be contained in the non-aqueous electrolytic solution include ethylene sulfite (ES), propane sultone (PS), butane sultone (BS), dioxathiolane-2,2-dioxide (DD), sulfolene, 3-methylsulfolene, sulfolane (SL), succinic anhydride (SUCAH), propionic anhydride, acetic anhydride, maleic anhydride, diallyl carbonate (DAC), dimethyl 2,5-dioxahexanedioate, dimethyl 2,5-dioxahexanedioate, furan, 2,5-dimethylfuran, diphenyl disulfide (DPS), dimethoxyethane (DME), dimethoxymethane (DMM), diethoxyethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonate electrolytic solutions, glyme, ether, acetonitrile, propionitrile, γ-butyrolactone, γ-valerolactone, dimethylsulfoxide (DMSO) ionic liquids, phosphazene, aliphatic carboxylic acid esters such as methyl formate, methyl acetate, and ethyl propionate, and those obtained by replacing some hydrogen atoms of these compounds with fluorine atoms.

The non-aqueous solvent contains an organic solvent having a boiling point of 125° C. or less (also called "a low-boiling point solvent"). The content of the low-boiling point solvent in the electrolytic solution is preferably 0.1 wt % or more. For example, one or more selected from carbonates, ethers, ester compounds, and phosphoric acid ester compounds can be contained as low-boiling point solvents.

Gas can be generated when at least one of the solvents constituting the electrolytic solution volatilizes. Examples include dimethyl carbonate (boiling point: 90° C.) and methyl ethyl carbonate (boiling point: 107° C.). Also, gas that forms an insulating layer is preferably a nonflammable or fire-resistant gas, and thus preferably contains a fluorine or phosphorus atom. Examples include fluorinated carbonates such as methyl 2,2,2-trifluoroethyl carbonate (boiling point: 74° C.), fluorinated esters such as 2-fluoroethyl acetate (boiling point: 79° C.), fluorinated ethers such as tetrafluoroethyl tetrafluoropropyl ether (boiling point: 92° C.) and decafluoro propyl ether (boiling point: 106° C.), and phosphoric acid esters.

The redox shuttle agent contained in the electrolytic solution repeats the oxidation-reduction reaction between the electrodes when the potential difference between the electrodes becomes equal to or higher than a predetermined reaction potential corresponding to the kind of the redox shuttle agent. Since the current is consumed by repetition of this oxidation-reduction reaction, it is suppressed that the battery potential exceeds the reaction potential of the redox shuttle agent, and as a result, the overcharge of the secondary battery is prevented.

As a redox shuttle agent, it can be used a compound which can be uniformly dissolved or dispersed in a non-aqueous electrolyte and has an oxidation potential higher than the maximum potential (of SOC 100%) normally used for a positive electrode active material. However, it is preferable to select the redox shuttle agent appropriately according to the maximum potential used for the positive electrode active material. The oxidation potential of the redox shuttle agent is preferably 0.1 to 2 V higher than the maximum potential of the positive electrode, more preferably 0.2 to 1 V higher. When the oxidation potential of the redox shuttle agent is within the above range, it is possible to suppress the reaction of the redox shuttle agent when the secondary battery is operated at a normal voltage, and in the case of abnormality such as overcharge, the redox shuttle agent can reacts immediately to stop the operation of the secondary battery.

Types of compounds that can be used as the redox shuttle agent include aromatic compounds, heterocyclic complexes, metallocene complexes such as ferrocene, Ce compounds, radical compounds and the like. In addition, only one kind of redox shuttle agent can be used alone, or two or more kinds thereof can be used in combination.

Specific examples of the compounds include, for example, heterocyclic compounds having one or more electron-withdrawing or electron-donating substituents such as 3,4-difluoroanisole, 2,4-difluoroanisole, 2,4-difluoroanisole, 1-methoxy-2,3,4,5,6-pentafluorobenzene, 2,3,5,6-tetrafluoroanisole, 4-(trifluoromethoxy) anisole, 3,4-dimethoxybenzonitrile, 1,2,3,4-tetrachloro-5,6-dimethoxybenzene, 1,2,4,5-tetrachloro-3,6-dimethoxybenzene 4-fluoro-1,2-dimethoxybenzene, 4-bromo-1,2-dimethoxybenzene, 2-bromo-1,4-dimethylbenzene, 1-bromo-3-fluoro-4-methoxybenzene, 2-bromo-1,3-difluoro-5-methoxybenzene, 4,5-difluoro-1,2-dimethoxybenzene, 2,5-difluoro-1,4-dimethoxybenzene, 1,2,3,4-tetrachloro-5,5-dimethoxycyclopentadiene, 1,2,4 trimethoxybenzene, 1,2,3-trimethoxybenzene, 2,5-di-tert-butyl-1,4-dimethoxybenzene, 4-tert-butyl-1,2-dimethoxybenzene, 1,4-ditetrabutyl-2,5-trifluoromethoxybenzene, 1,2-ditetrabutyl-4,5-trifluoromethoxybenzene; heterocyclic compounds such as 4-chloro-1,2-methylenedioxybenzene, 4-bromo-1,2-methylenedioxybenzene, 3,4-methylenedioxybenzonitrile, 4-nitro-1,2-methylenedioxybenzene, 2-chloro-5-methoxypyrazine; radical compound such as nitroxyl radical compound; cerium compounds such as cerium nitrate; metallocene complexes such as ferrocene complexes can be used alone or in combination of two or more.

The redox shuttle agent is a compound that can be uniformly dissolved or dispersed in the nonaqueous electrolyte and can be appropriately selected according to the required maximum potential of the positive electrode. Each of these compounds has a reaction potential corresponding to each compound, and when it is higher than the reaction potential, the oxidation reaction rate greatly increases. For example, 2,5-di-tert-butyl-1,4-dimethoxybenzene has a reaction potential of about 3.9 V and 4-bromo-1,2-dimethoxybenzene has a reaction potential of about 4.3 V.

When the battery is charged at a constant current, if the voltage between the positive and negative electrodes of the battery becomes high voltage and the redox shuttle agent in the electrolytic solution is exposed to a potential higher than the reaction potential, the redox shuttle agent reacts and repeat the oxidation-reduction reaction with the negative electrode. Heat is generated according to the reaction amount, and the temperature of the electrolytic solution is raised.

In addition, since aromatic compounds having one or more alkoxy groups (methoxybenzenes and dimethoxybenzenes) have excellent chemical stability of the oxidant produced by the oxidation reaction, deterioration of the battery performance due to side reactions and the like can be suppressed, in addition, since a compound including a halogen atom has high redox potential, it can be applied to a positive electrode having a higher redox reaction potential, that is, a secondary battery having a higher energy density.

Optionally, the electrolytic solution also contains at least one of a gel component and silica particles.

When the electrolytic solution contains a gel component, the electrolytic solution is gelled by this gel component to attain a gel form. The gel component is provided by the crosslinking of a gelling agent added to the electrolytic solution, and, thus, it can be said that the electrolytic solution contains a crosslinked product of the gelling agent. The crosslinked product of the gelling agent is synonymous to the gel component. The gelling agent added to the electrolytic solution can be identified by analyzing the composition of the gelled electrolytic solution. Also, the content of the gel component in the electrolytic solution can be considered substantially identical to the amount of the gelling agent added. The gel component contained in the electrolytic solution and the content thereof do not substantially change even after the battery is charged and discharged.

As the gelling agent, for example, an acrylic resin, a fluoroethylene resin, and the like can be used singly or in combination. Also, the gelling agent preferably contains an acrylic acid ester polymer or methacrylic add ester polymer having a crosslinkable functional group. The amount of the gelling agent added to the electrolytic solution is preferably 0.5 wt % or more.

Specific examples of the gelling agent include monomers, oligomers, or copolymerized oligomers having two or more thermally polymerizable polymerizing groups per molecule. Specific examples include di-functional acrylates such as ethylene glycol diacrylate, diethylene glycol diacrylate, triethylene glycol diacrylate, tetraethylene glycol diacrylate, propylene diacrylate, dipropylene diacrylate, tripropylene diacrylate, 1,3-butanediol diacrylate, 1,4-butanediol diacrylate, and 1,6-hexanediol diacrylate, tri-functional acrylates such as trimethylolpropane triacrylate and pentaerythritol triacrylate, tetra-functional acrylates such as ditrimethylolpropane tetraacrylate and pentaerythritol tetraacrylate, and methacrylate analogous monomers of these that form acrylic polymers. Examples other than these include monomers such as urethane acrylate and urethane methacrylate, copolymerized oligomers thereof, and copolymerized oligomers with acrylonitrile. Also, polymers that can dissolve and gel in plasticizers such as polyvinylidene fluoride, polyethylene oxide, and polyacrylonitrile can be used as well.

The gelling agent is not limited to the above monomers, oligomers, or polymers, and any gelling agent can be used as long as it can gel. Also, gelation is not limited to one monomer, oligomer, or polymer, and two to several gelling components can be used as a mixture as necessary. Moreover, benzoins, peroxides, and the like can also be used as thermal polymerization initiators as necessary. However, thermal polymerization initiators are not limited to these.

Also, a methacrylic acid ester polymer represented by general formula (1) below can be contained as a gelling agent. Due to the crosslinking of this methacrylic acid ester polymer, the electrolytic solution gels.

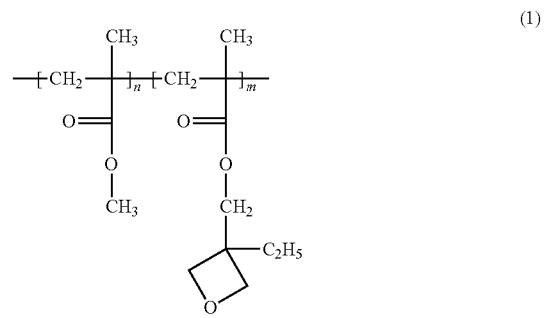

(1)

In general formula (1), n satisfies $1800<n<3000$, and m satisfies $350<m<600$.

The methacrylic acid ester polymer represented by general formula (1) is obtained by radically copolymerizing methyl methacrylate and (3-ethyl-3-oxetanyl) methyl methacrylate, n indicating die number of methyl methacrylate units satisfies $1800<n<3000$, and m indicating the number of (3-ethyl-3-oxetanyl) methyl methacrylate units satisfies $350<m<600$. Note that the methacrylic acid ester polymer represented by general formula (1) may be a block copolymer and may be a random copolymer. Also, n and m indicate average values and are not integers in some cases.

A crosslinked product obtained by crosslinking the methacrylic acid ester polymer represented by general formula (1) (hereinafter simply referred to as a "crosslinked product") is obtained by subjecting the oxetanyl group of the methacrylic acid ester polymer represented by general formula (1) to ring-opening polymerization using a cationic polymerization initiator. Although a generally known polymerization initiator can be used as a cationic polymerization initiator, it is preferable to utilize a lithium salt contained in the electrolytic solution and a small amount of an acidic substance resulting from the hydrolysis of the anionic component of the lithium salt because properties imparted to the battery are minor. Here, the content of the lithium salt in the electrolytic solution is identical to a preferable concentration of a supporting electrolyte in the electrolytic solution.

The electrolytic solution containing a gel component is conveniently and stably produced by, for example, a method having the step of dissolving a supporting electrolyte in an aprotic solvent, the step of mixing the aprotic solvent with a methacrylic acid ester polymer represented by general formula (1) as a gelling agent, and the step of crosslinking the methacrylic acid ester polymer represented by general formula (1).

A higher proportion of the gel component in the electrolytic solution provides a greater bubble retaining effect, and thus the proportion is preferably 0.1 mass % or more, more preferably 0.5 mass % or more, and even more preferably 1.0 mass % or more. On the other hand, an excessive content of the gel component results in an increase in the viscosity of the electrolytic solution, thus impairing the introducibility of the solution between the electrodes and ion conductivity.

Accordingly, the proportion of the gel component in the electrolytic solution is preferably 10 mass % or less, more preferably 5 mass % or less, and even more preferably 3 mass % or less.

Optionally, the electrolytic solution can contain silica particles. Silica particles preferably have a particle size of 0.01 µm or more, and the content in the electrolytic solution is preferably 0.1 wt % or more.

For enhanced dispersibility in the electrolytic solution and favorable dispersion into the voids of the separator, the average particle size of silica particles is preferably 10 µm or less, more preferably 5 µm or less, and even more preferably 1 µm or less. Silica having an average particle size of 10 µm or less can be easily introduced into the battery while being uniformly dispersed in the electrolytic solution. Also, by chemically bonding the surface hydroxyl group of silica and the functional group of the polymer, the dispersibility of silica in the electrolytic solution can be further enhanced. Silica thus uniformly dispersed makes it possible to enhance the insulation of the electrolytic solution. That is to say, even when the non-aqueous solvent component of the electrolytic solution volatilizes and the heat decomposition temperature of the gel component is reached due to abnormal heat generation of the battery, silica and electrolytic solution residues in which silica serves as nuclei remain between the electrodes, and thus the insulation between the electrodes can be maintained. Also, when there is a chemical bond or a hydrogen bond between the electrolytic solution and silica, a so-called inorganic/organic hybrid polymer is formed, thus the heat resistance of the polymer itself is enhanced, and the insulated state between the electrodes can be maintained to high temperatures. The chemical bond of silica and the polymer can be formed by the hydroxy group on the silica surface and, for example, the carboxyl group, the epoxy group, or the oxetane group of the polymer.

In particular, when the electrolytic solution contains the gel component, due to the electrolytic solution further containing silica particles, it is possible to more stably retain bubbles between the electrodes and enhance the effect of blocking ion conduction. Also, when silica particles have not only a chemical bond but also a hydrogen bond with the gel component in the electrolytic solution, the heat resistance of the gel component is enhanced, and thus the generated bubbles also can be favorably retained in a bubble state even in a high-temperature environment.

In order to enable the above effects to be exerted, the content of silica particles based on the electrolytic solution is preferably in a range of 0.05 to 10 mass % of the electrolytic solution. Also, in order to maintain dispersibility, the content of silica particles based on the electrolytic solution is preferably 10 mass % or less, more preferably 5 mass % or less, and even more preferably 3 mass % or less. In order to impart heat resistance to the electrolytic solution, the content of silica particles based on the electrolytic solution is preferably is 0.05 mass % or more, more preferably 0.1 mass % or more, and even more preferably 0.5 mass % or more.

Also, besides silica, an inorganic material that has a melting point of 300° C. or more, is highly insulating, and has a hydroxy group on the surface can be used in the same manner as silica. Examples of this kind of inorganic materials include alumina, isinglass, mica, montmorillonite, zeolite, and clay minerals.

<Casing>

A casing that Is stable in the electrolytic solution and has sufficient water-vapor barrier properties can be suitably selected. For example, in the case of a layered laminate secondary battery, a laminate film of aluminum and resin is preferably used as a casing. The casing may be composed of a single member and may be composed of a combination of a plurality of members.

The casing can be provided with a safety valve so as to open when an abnormality occurs to allow the electrolytic solution inside to be discharged to the outside of the secondary battery. With the casing provided with a safety valve, bubbles are generated between the electrodes due to abnormal beat generation of the secondary battery, and the electrolytic solution expelled from between the electrodes by the generated bubbles is discharged to the outside of the secondary battery through the safety valve together with the volatile component.

As a safety valve, a known safety valve used as a safety valve for this kind of secondary batteries, such as any safety valve of a pressure detecting type or a temperature detecting type, can be used. The pressure detecting type is a mechanism represented by a burst valve, and is not particularly limited as long as it operates according to the internal pressure increased by the volatilized electrolytic solution. The temperature detecting type is represented by a mechanism in which the laminate exterior or a joined sealed part thereof thermally melts to thereby release the volatile component inside to the outside of the battery, but is not necessarily limited thereto.

The battery element of the present invention is not limited to the battery element of the lithium ion secondary battery above, and the present invention is applicable to any batteries. However, heat dissipation problems are in many cases problematic in high-capacity batteries, and the present invention is thus preferably applied to high-capacity batteries and, in particular, lithium ion secondary batteries.

Below, one embodiment of the production method for a battery of the present invention is described.

One embodiment of the production method for a battery of the present invention comprises:

a step of providing an electrolytic solution comprising a redox shuttle agent and an organic solvent having a boiling point of 125° C. or less;

a step of providing the separator 13 comprising aramid fiber assembly, aramid microporous structure, polyimide microporous structure or polyphenylenesulfide microporous structure, and having an average void size of 0.1 µm or more;

a step of providing the positive electrode 11 and the negative electrode 12;

a step of oppositely disposing the positive electrode 11 and the negative electrode 12, with the separator 13 in-between; and a step of enclosing the oppositely disposed separator 13, positive electrode 11, and negative electrode 12 within the casing together with the electrolytic solution.

In the above production method, the step of providing the electrolytic solution may include mixing a gelling agent in the electrolytic solution. In this case, the production method for the secondary battery further includes a step of gelling the gelling agent. In addition, the step of gelling the gelling agent can be performed after the step of enclosing the separator 13, the positive electrode 11, the negative electrode 12 within the casing together with the electrolytic solution. In particular, when the gelling agent contains an acrylic acid ester polymer or methacrylic acid ester polymer having a crosslinkable functional group, the step of gelling the gelling agent can comprise the step of gelling the electrolytic solution by thermally crosslinking the acrylic acid ester polymer or methacrylic acid ester polymer.

EXAMPLES

Below, the present invention is described in detail.

Example 1

(Positive Electrode)

A lithium nickel oxide (LNO), a carbon electroconducting agent, and polyvinylidene fluoride as a binding agent were dispersed in N-methyl-2-pyrrolidone (NMP) in a weight ratio of 92:4:4 to prepare a slurry, applied to an aluminum current collector foil, and dried to form a positive electrode active material layer. An active material layer was also formed on the back surface of the aluminum current collector foil in the same manner, and then rolling was performed to obtain a positive electrode plate.

(Negative Electrode)

Natural graphite, carboxymethyl methylcellulose sodium as a thickening agent, and styrene butadiene rubber as a binding agent were mixed in an aqueous solution in a weight ratio of 98:1:1 to prepare a slurry, applied to a copper current collector foil, and dried to form a negative electrode active material layer. An active material layer was also formed on the back surface of the copper current collector foil in the same manner, and rolling was performed to obtain a negative electrode plate.

(Separator)

A non-woven aramid fabric having a thickness of 20 µm was used as a separator. The average void size of this non-woven aramid fabric was 1 µm. The heat decomposition temperature of the aramid used exceeded 400° C. or more, and the shrinkage of the separator at 200° C. was less than 1%.

(Electrolytic Solution)

For the non-aqueous solvent of the electrolytic solution, a non-aqueous solvent obtained by mixing EC (ethylene carbonate), DEC (diethyl carbonate), and EMC (ethyl methyl carbonate) in a volume ratio of 30:50:20 was used. The boiling point of EC is 238° C., the boiling point of DEC is 127° C., and the boiling point of EMC is 108° C., 0.1 M of 4-(trifluoromethoxy) anisole as a redox shuttle agent, 1 mass % of a methacrylic acid ester polymer represented by general formula (1) as a gelling agent and 0.05 mass % of a silica having an average particle diameter of 2.9 µm were added. As a supporting electrolyte, $LiPF_6$ was dissolved to a concentration of 1 M. At this stage, the electrolytic solution is not gelled and is liquid.

(Preparation of Battery)

The positive electrode plate was cot to a size of 90 mm×m□100 mm excluding an electric current extracting part, the negative electrode plate was cut to a size of 94 mm×□104 mm excluding an electric current extracting part, and the positive electrode plate and the negative electrode plate were laminated with the separator in-between. The capacity of the battery was 10 Ah.

The electrode laminate obtained by laminating the electrodes and the separator was connected to electrode tabs, and accommodated in a film casing composed of a laminate film of aluminum film and resin film. The electrode laminate was accommodated in the casing by thermally fusing the laminate film along the outer circumference of the electrode laminate. The laminate film was thermally fused along the entire circumference of the electrode laminate except for a portion that served as an opening for introducing the electrolytic solution. Also, a portion having a sealing width narrowed to 2 mm was provided on the side opposite to the electrode tabs, and this was regarded as a gas release mechanism.

Then, the electrolytic solution was introduced through the opening into the casing where the electrode laminate was accommodated. After the electrolytic solution was introduced, the casing was sealed in a reduced-pressure atmosphere. Thereafter, the casing was heated for 8 hours in a thermostat at 50° C. to allow the electrolytic solution to gel, and a battery was thus prepared.

(Overcharge Test)

The laminate portion of the battery was secured with a flat presser plate at a predetermined size in accordance with the thickness of the battery. No pressure was applied to the laminate by the presser plate prior to the testing.

The overcharge test was performed at 30 A. The surface temperature of the battery reached 95° C. at a battery voltage of about 4.8 V, and thereafter the voltage rapidly increased to 12 V or more and the gas release mechanism was opened, but the battery neither burst nor emitted smoke.

Example 2

A battery was prepared in the same manner as Example 1 except that 0.05 mass % of silica was not added to the electrolytic solution. The overcharge test was performed at 30 A. The surface temperature of the battery reached 95° C. at a battery voltage of about 4.9 V and the gas release mechanism was opened, and thereafter the voltage rapidly increased to 12 V or more, but the battery neither burst nor emitted smoke.

Example 3

A battery was prepared in the same manner as Example 2 except that the gelling agent was not added. The overcharge test was performed at 30 A. The surface temperature of the battery reached 95° C. at a battery voltage of about 5.0 V, and thereafter the voltage rapidly increased to 12 V or more and fee gas release mechanism was opened, but the battery neither burst nor emitted smoke.

Example 4

A battery was prepared in the same manner as Example 3 except that aramid having microporous structure was used as a separator. The aramid used bad an average void size of 0.1 µm and a beat decomposition temperature exceeding 400° C. or more as in Example 1, and the shrinkage of the separator at 200° C. was less than 0.2%. The overcharge test was performed at 30 A. The surface temperature of the battery reached 95° C. at a battery voltage of about 5.0 V, and thereafter the voltage rapidly increased to 12 V or more and the gas release mechanism was opened, but the battery neither burst nor emitted smoke.

Example 5

A battery was prepared in the same manner as Example 1 except that polyimide having microporous structure was used as a separator. The polyimide used bad an average void size of 0.3 µm and a heat decomposition temperature exceeding 500° C. or more, and the shrinkage of the separator at 200° C. was less than 0.2%. The overcharge test was performed at 30 A. The surface temperature of the battery readied 95° C. at a battery voltage of about 5.0 V, and thereafter the voltage rapidly increased to 12 V or more and the gas release mechanism was opened, but the battery neither burst nor emitted smoke.

Example 62

A battery was prepared in the same manner as Example 1 except that polyphenylene sulfide (PPS) having microporous structure was used as a separator. The PPS used bad an average void size of 0.5 µm and a melting point exceeding 280° C. or more, and the shrinkage of the separator at 200° C. was less than 3%. The overcharge test was performed at 30 A. The surface temperature of the battery reached 95° C. at a battery voltage of about 5.0 V, and thereafter the voltage rapidly increased to 12 V or more and the gas release mechanism was opened, but the battery neither burst nor emitted smoke.

Example 7

A battery was prepared in the same manner as Example 2 except that the additive amount of the gelling agent to the electrolytic solution was 0.5 mass %. The overcharge test was performed at 30 A. The surface temperature of the battery reached 95° C. at a battery voltage of about 4.9 V, and thereafter the voltage rapidly increased to 12 V or more and the gas release mechanism was opened, but the battery neither burst nor emitted smoke.

Example 8

A battery was prepared in the same manner as Example 2 except that the additive amount of the gelling agent to the electrolytic solution was 3.0 mass %. The overcharge test was performed at 30 A. The surface temperature of the battery reached 95° C. at a battery voltage of about 4.8 V, and thereafter the voltage rapidly increased to 12 V or more and the gas release mechanism was opened, but the battery neither burst nor emitted smoke.

Comparative Example 1

A battery was prepared in the same manner as Example 3 except that the redox shuttle agent was not added to the electrolytic solution. The overcharge test was performed at 30 A. The surface temperature of the battery reached 95° C. at a battery voltage of about 6 V. As charging continued, the battery voltage continued to rise, after rising to 12 V or more, the battery emitted smoke.

Comparative Example 2

A battery was prepared in the same manner as Comparative Example 1. The overcharge test was performed at 1.0 A. The surface temperature of the battery reached 95° C. at a battery voltage of about 6 V. As charging continued, the battery voltage continued to rise and the voltage rose to 12 V or more. The surface temperature of the battery reached 95° C. and then the temperature began to drop. The battery neither burst nor emitted smoke.

Comparative Example 3

A battery was prepared in the same manner as Example 3. The overcharge test was performed at 10 A. The surface temperature of the battery reached 95° C. at a battery voltage of about 4.8 V. As charging continued, the battery voltage continued to rise, after rising to 12 V or more, the gas release mechanism was opened, but the battery neither burst nor emitted smoke.

Comparative Example 4

A battery was prepared in the same manner as Example 3 except that polypropylene nonwoven fabric was used as a separator. The average void size of the polypropylene was 1 µm. The overcharge test was performed at 10 A. The surface temperature of the battery reached 95° C. at a battery voltage of about 5.2 V. As charging continued, the battery voltage continued to rise, after rising to 12 V or more, the battery burst.

Comparative Example 5

A battery was prepared in the same manner as Example 3 except that microporous polypropylene was used as a separator. The average void size of the polypropylene was 0.01 µm. The overcharge test was performed at 10 A. The surface temperature of the battery reached 95° C. at a battery voltage of about 4.8 V. As charging continued, the battery voltage continued to rise, after rising to 12 V or more, the battery burst.

Comparative Example 6

A battery was prepared in the same manner as Example 3 except that non-aqueous solvent obtained by mixing EC and DEC in a volume ratio of 30:70 was used as the non-aqueous solvent of the electrolytic solution. The overcharge test was performed at 10 A. The surface temperature of the battery reached 95° C. at a battery voltage of about 6.0 V. As charging continued, the battery voltage continued to rise, after rising to 12 V or more, the battery burst.

Results of the Examples and the Comparative Examples are shown in Table 1. A potential at which the voltage rapidly increased in the overcharge test is indicated as a resistance increasing potential. A smaller value of this electrical potential indicates that the function of the battery was stopped at a safer potential. Comparing Comparative Example 1 with Comparative Example 2, in Comparative Example 1 in which the charging rate was increased to 3 C (30 A), since the heat dissipating area was the same, the temperature of the battery rapidly increased and the battery emitted smoke. On the other hand, in Examples 1 to 6, the batteries did not emit smoke. This is presumably because heat generation by the redox shuttle agent occurred before the heat generation of the active material of the electrode occurred, that is, at a relatively low potential, and the ion conduction was interrupted by the vaporized gas of the electrolytic solution. In contrast, in Comparative Example 4 and Comparative Example 5, although the charging rate was low, the batteries burst.

This is presumed that the ion conduction was once shut off by the heat generation of redox shuttle agent but the internal short-circuit immediately occurs due to melting or thermal decomposition of the separator, so that a rapid temperature rise occurs inside the batteries, resulting in an explosive state. In Comparative Example 6, since the boiling point of the non-aqueous solvent is high, the solvent is not vaporized due to the heat generation of the redox shuttle agent, and charging of the active material continues until generation of gas by electrolysis, which is presumed to cause smoke.

TABLE 1

| | Separator | | Electrolytic solution | | | | Overcharge test | | Resistance |
|---|---|---|---|---|---|---|---|---|---|
| | Material | Void size (μm) | Minimum boiling point (□) | Redox shuttle agent (M) | Gel (mass %) | Silica (mass %) | Rate | Determination | increasing potential (V) |
| Example 1 | Aramid | 1.0 | 108 | 0.1 | 1.0 | 0.05 | 3C | Emitted no smoke | 4.8 |
| Example 2 | Aramid | 1.0 | 108 | 0.1 | 1.0 | None | 3C | Emitted no smoke | 4.9 |
| Example 3 | Aramid | 1.0 | 108 | 0.1 | None | None | 3C | Emitted no smoke | 5.0 |
| Example 4 | Aramid | 0.1 | 108 | 0.1 | None | None | 3C | Emitted no smoke | 5.0 |
| Example 5 | Polyimide | 0.3 | 108 | 0.1 | 1.0 | 0.05 | 3C | Emitted no smoke | 5.0 |
| Example 6 | PPS | 0.5 | 108 | 0.1 | 1.0 | 0.05 | 3C | Emitted no smoke | 5.0 |
| Example 7 | Aramid | 1.0 | 108 | 0.1 | 0.5 | None | 3C | Emitted no smoke | 4.9 |
| Example 8 | Aramid | 1.0 | 108 | 0.1 | 3.0 | None | 3C | Emitted no smoke | 4.8 |
| Comparative Example 1 | Aramid | 1.0 | 108 | None | None | None | 3C | Emitted no smoke | 6.0 |
| Comparative Example 2 | Aramid | 1.0 | 108 | None | None | None | 1C | Emitted no smoke | 6.0 |
| Comparative Example 3 | Aramid | 1.0 | 108 | 0.1 | None | None | 1C | Emitted no smoke | 4.8 |
| Comparative Example 4 | PP | 0.01 | 108 | 0.1 | None | None | 1C | Burst | 5.2 |
| Comparative Example 5 | PP | 0.01 | 108 | 0.1 | None | None | 1C | Burst | 4.8 |
| Comparative Example 6 | Aramid | 1.0 | 127 | 0.1 | None | None | 1C | Emitted smoke | 6.0 |

INDUSTRIAL APPLICABILITY

The battery according to the present invention can be utilized in, for example, any industrial field where a power source is required and industrial field relating to the transport, storage, and supply of electrical energy. Specifically, it can be utilized for power sources of mobile devices such as cell phones and notebook computers; power sources of movement/transport media such as trains, satellites, and submarines, including electric vehicles such as electric automobiles, hybrid cars, electric motorcycles, and electrically assisted bicycles; backup power sources such as UPSs; power storage facilities that store electric power produced by solar power production, wind power production, and the like; etc.

Figure 4:
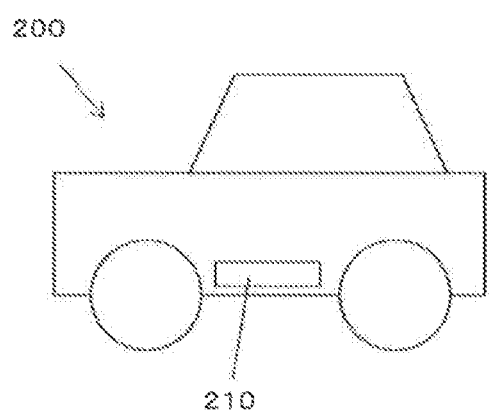
FIG. 4 is a schematic view showing one example of an electric automobile provided with the battery of the present invention.
Figure 5:
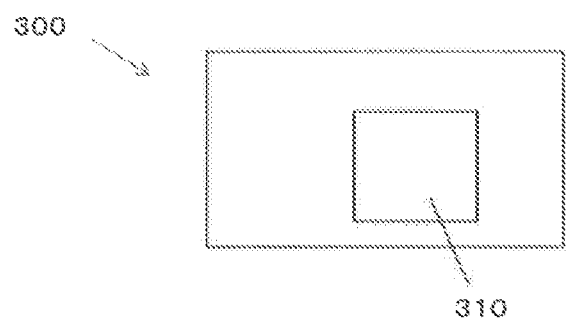
FIG. 5 is a schematic view of one example of a power storage facility provided with the battery of the present invention.

As one example of the above various devices and power storage facilities, FIGS. 4 and 5 show an electric automobile 200 and a power storage facility 300, respectively. The electric automobile 200 and the power storage facility 300 have battery packs 210, 310, respectively. The battery packs 210, 310 are configured such that a plurality of the above-described batteries 1 are connected in series and in parallel to satisfy the required capacity and voltage.

EXPLANATION OF SYMBOLS

1 Secondary battery
10 Battery element
11 Positive electrode
11a Positive electrode current collector
12 Negative electrode
12a Negative electrode current collector
13 Separator
21, 22 Casing
31 Positive electrode terminal
32 Negative electrode terminal
200 Electric automobile
210, 310 Battery packs
300 Power storage facility

The invention claimed is:

1. A secondary battery comprising:
a battery element comprising a positive electrode, a negative electrode, a separator, and an electrolytic solution; and
a casing sealing the battery element, wherein
the electrolytic solution comprises a redox shuttle agent, a gel component, and an organic solvent having a boiling point of 125° C. or less; and
the separator comprises aramid fiber assembly, aramid microporous structure, polyimide microporous structure or polyphenylenesulfide microporous structure, and has an average void size of 0.1 μm or more;
further wherein the redox shuttle agent is an aromatic compound having one or more alkoxy groups,
the positive electrode, the negative electrode, and the separator include the electrolyte solution comprising the gel component, and
a proportion of the gel component in the electrolytic solution is 0.5 to 3 mass %.

2. The secondary battery according to claim 1, wherein a content of the organic solvent in the electrolytic solution is 0.1 wt % or more.

3. The secondary battery according to claim 2, wherein the organic solvent comprises one or more selected from carbonates, ethers, ester compounds, and phosphoric acid ester compounds.

4. The secondary battery according to claim 1, wherein the separator is a non-woven fabric.

5. The secondary battery according to claim 1, wherein a gelling agent providing the gel component is an acrylic resin and/or a fluoroethylene resin.

6. The secondary battery according to claim 1, wherein a gelling agent providing the gel component comprises an acrylic acid ester polymer or methacrylic acid ester polymer having a crosslinkable functional group.

7. The secondary battery according to claim 1, wherein the electrolytic solution further comprises silica particles.

8. An electric vehicle comprising the battery according to claim 1.

9. A power storage facility comprising the battery according to claim 1.

10. A production method for a secondary battery, comprising:
   a step of providing an electrolytic solution comprising a redox shuttle agent, a gelling agent, and an organic solvent having a boiling point of 125° C. or less;
   a step of providing a separator comprising aramid fiber assembly, aramid microporous structure, polyimide microporous structure or polyphenylenesulfide microporous structure, and having an average void size of 0.1 μm or more;
   a step of providing a positive electrode and a negative electrode;
   a step of oppositely disposing the positive electrode and the negative electrode, with the separator in-between;
   a step of enclosing the oppositely disposed separator, positive electrode, and negative electrode within the casing together with the electrolytic solution; and
   a step of gelling the gelling agent;
   further wherein the redox shuttle agent is an aromatic compound having one or more alkoxy groups;
   the positive electrode, the negative electrode, and the separator enclosed within the casing include the electrolyte solution comprising the gelling agent before the electrolyte solution is gelled; and
   a proportion of the gelling agent in the electrolytic solution is 0.5 to 3 mass %.

11. The production method for a secondary battery according to claim 10, wherein
   the gelling agent comprises an acrylic acid ester polymer or methacrylic acid ester polymer having a crosslinkable functional group;
   the step of gelling the gelling agent is performed after the step of enclosing the separator, the positive electrode, and the negative electrode within the casing together with the electrolytic solution, and the step of gelling the gelling agent comprises a step of gelling the electrolytic solution by thermally crosslinking the acrylic acid ester polymer or methacrylic acid ester polymer.

12. The secondary battery according to claim 1, wherein the separator has a thickness of 5 μm to 50 μm.

13. The secondary battery according to claim 1, wherein the separator has a thickness of 20 μm to 50 μm.

14. The secondary battery according to claim 1, wherein the separator has the average void size of 0.1 μm to 10 μm.

15. The secondary battery according to claim 1, wherein the separator has the average void size of 1.0 μm to 10 μm.

16. The secondary battery according to claim 1, wherein the concentration of the redox shuttle agent in the electrolytic solution is 0.1 M or more.

17. The secondary battery according to claim 1, wherein the aromatic compound having one or more alkoxy groups includes a halogen atom.

* * * * *